US012559300B2

(12) United States Patent
Schaedler et al.

(10) Patent No.: US 12,559,300 B2
(45) Date of Patent: Feb. 24, 2026

(54) MOWER PACKING, STORAGE, AND CHARGING ASSEMBLY

(71) Applicant: MTD PRODUCTS INC, Valley City, OH (US)

(72) Inventors: Axel Schaedler, Olmsted Falls, OH (US); Paul Luikart, Valley City, OH (US)

(73) Assignee: MTD PRODUCTS INC, Valley City, OH (US)

( * ) Notice: Subject to any disclaimer, the term of this patent is extended or adjusted under 35 U.S.C. 154(b) by 826 days.

(21) Appl. No.: 17/868,073

(22) Filed: Jul. 19, 2022

(65) Prior Publication Data

US 2023/0012954 A1    Jan. 19, 2023

Related U.S. Application Data

(60) Provisional application No. 63/223,314, filed on Jul. 19, 2021.

(51) Int. Cl.
| | |
|---|---|
| *A01D 75/00* | (2006.01) |
| *A01D 34/67* | (2006.01) |
| *A01D 34/81* | (2006.01) |
| *A01D 34/82* | (2006.01) |
| *B65D 85/68* | (2006.01) |
| *H01M 50/244* | (2021.01) |
| *H01M 50/249* | (2021.01) |

(Continued)

(52) U.S. Cl.
CPC ............. *B65D 85/68* (2013.01); *A01D 34/67* (2013.01); *A01D 34/824* (2013.01); *A01D 75/00* (2013.01); *A01D 75/006* (2013.01);

*H01M 50/244* (2021.01); *H01M 50/249* (2021.01); *A01D 34/78* (2013.01); *A01D 34/81* (2013.01); *A01D 2101/00* (2013.01)

(58) Field of Classification Search
CPC .... B65D 85/68; A01D 75/002; A01D 75/004; A01D 75/006; A01D 75/00; A01D 2101/00; H01M 50/244; H01M 50/249
See application file for complete search history.

(56) References Cited

U.S. PATENT DOCUMENTS

| | | | | | |
|---|---|---|---|---|---|
| 2,281,923 | A | * | 5/1942 | Davis | ..................... A01D 34/62 |
| | | | | | 206/320 |
| 2,311,514 | A | * | 2/1943 | Bramblett | ................ B60J 11/00 |
| | | | | | 296/136.1 |

(Continued)

FOREIGN PATENT DOCUMENTS

| | | | | | |
|---|---|---|---|---|---|
| EP | 1695610 | A1 | * | 8/2006 | ............. A01D 34/81 |
| GB | 2386813 | A | * | 10/2003 | ........... A01D 34/824 |
| GB | 2520001 | A | * | 5/2015 | ........... A01D 34/001 |

*Primary Examiner* — Adam J Behrens
(74) *Attorney, Agent, or Firm* — Wegman Hessler Valore

(57) ABSTRACT

A reusable case for packing, storing, transporting and/or charging an outdoor power equipment is discussed, along with outdoor power equipment configured to be stored within the case. One example embodiment comprises a case for storing outdoor power equipment, comprising: a top portion; and a bottom portion movably connected to the top portion, wherein the bottom portion has one or more openings to allow one or more wheels of an outdoor power equipment to protrude through the one or more openings; wherein the top portion and the bottom portion are configured to substantially enclose the outdoor power equipment in a closed configuration.

16 Claims, 13 Drawing Sheets

(51) Int. Cl.
*A01D 34/78* (2006.01)
*A01D 101/00* (2006.01)

(56) References Cited

U.S. PATENT DOCUMENTS

| | | | | |
|---|---|---|---|---|
| 3,087,585 | A * | 4/1963 | Ronnsater | E04H 6/00 |
| | | | | 52/143 |
| 3,600,866 | A * | 8/1971 | Griffith | B60J 11/00 |
| | | | | 49/73.1 |
| 4,008,847 | A * | 2/1977 | Davis | B65D 5/5014 |
| | | | | 206/335 |
| 4,178,977 | A * | 12/1979 | Sur | A01D 34/001 |
| | | | | 220/8 |
| D260,149 | S * | 8/1981 | Harris | D15/17 |
| 4,306,390 | A * | 12/1981 | Brown | A63G 25/00 |
| | | | | 52/DIG. 14 |
| 4,673,227 | A * | 6/1987 | Anderson | A01D 34/001 |
| | | | | 248/89 |
| 4,800,701 | A * | 1/1989 | Dunsworth | E04H 6/005 |
| | | | | 52/143 |
| 4,804,087 | A * | 2/1989 | Smith | B65D 85/68 |
| | | | | 206/335 |
| 4,876,832 | A * | 10/1989 | Wasserman | A01D 34/001 |
| | | | | 52/DIG. 14 |
| 4,894,961 | A * | 1/1990 | Robbins | E04H 6/00 |
| | | | | D25/16 |
| 5,044,132 | A * | 9/1991 | Harman | E04H 6/04 |
| | | | | 135/88.06 |
| 5,209,051 | A * | 5/1993 | Langdon | A01D 34/82 |
| | | | | 56/DIG. 18 |
| 5,533,616 | A * | 7/1996 | Crowfoot | E04H 6/005 |
| | | | | 206/335 |
| D395,659 | S * | 6/1998 | Moiseve | D15/17 |
| 5,772,026 | A * | 6/1998 | Grigsby | B65D 85/68 |
| | | | | 206/319 |
| 6,263,648 | B1 * | 7/2001 | Carlson | B60J 11/00 |
| | | | | 296/136.1 |
| 6,332,554 | B1 * | 12/2001 | McCarthy | B25H 3/02 |
| | | | | 220/908 |
| 6,474,626 | B1 * | 11/2002 | Box | A01D 34/001 |
| | | | | 414/490 |
| D486,161 | S * | 2/2004 | Greene | D15/28 |
| D512,728 | S * | 12/2005 | Di Rienzo | D15/17 |
| 7,188,724 | B1 * | 3/2007 | Crain | B25H 3/006 |
| | | | | 206/349 |
| 7,736,103 | B1 * | 6/2010 | Leon | A01D 34/001 |
| | | | | 312/100 |
| 7,775,225 | B2 * | 8/2010 | Wade | A01D 34/003 |
| | | | | 134/198 |
| 8,511,495 | B2 * | 8/2013 | Grigsby | B65D 85/68 |
| | | | | 206/335 |
| 10,251,339 | B2 * | 4/2019 | Pillmore | A01D 34/81 |
| 10,954,033 | B2 * | 3/2021 | Kolecki | B65D 85/68 |
| 11,710,981 | B2 * | 7/2023 | Koenen | H02J 7/00032 |
| | | | | 307/9.1 |
| 2005/0011791 | A1 * | 1/2005 | Bartholomew | B65D 19/18 |
| | | | | 206/386 |
| 2014/0110287 | A1 * | 4/2014 | Hayden | B65D 85/68 |
| | | | | 206/335 |
| 2019/0100350 | A1 * | 4/2019 | Kolecki | B65D 19/06 |
| 2019/0230850 | A1 * | 8/2019 | Johnson | B65G 67/02 |
| 2024/0114835 | A1 * | 4/2024 | Kamo | A01D 43/086 |

* cited by examiner

440

MOWER PACKING, STORAGE, AND CHARGING ASSEMBLY

CROSS REFERENCE TO RELATED APPLICATIONS

This application claims the benefit of U.S. Provisional Application No. 63/223,314, filed Jul. 19, 2021 and titled MOWER PACKAGING, STORAGE AND CHARGING ASSEMBLY which is hereby incorporated by reference herein in its entirety.

FIELD OF DISCLOSURE

The disclosed subject matter pertains to assemblies, apparatuses, and methods for packing, storing, and/or charging outdoor power equipment and/or outdoor power equipment configured to operate with such assemblies, apparatuses, and/or methods.

BACKGROUND

Manufacturers of power equipment for outdoor maintenance applications offer many types of machines for general maintenance and mowing applications. Generally, these machines can have a variety of forms depending on application, from general urban or suburban lawn maintenance, rural farm and field maintenance, to specialty applications. Even specialty applications can vary significantly. For example, mowing machines suitable for sporting events requiring moderately precise turf, such as soccer fields or baseball outfields may not be suitable for events requiring very high-precision surfaces such as golf course greens, tennis courts and the like.

Generally, outdoor power equipment such as a lawn maintenance device is shipped entirely in temporary packaging, such as a large box that contains the outdoor power equipment in some form (e.g., partially assembled), which is disposed of after use in shipping and/or initial storage (e.g., before sale, etc.). Once removed from disposable packaging, outdoor power equipment is typically stored in its fully assembled form, taking up a significant amount of floorspace (e.g., in a garage, shed, etc.) when not in use.

BRIEF SUMMARY

The following presents a simplified summary in order to provide a basic understanding of some aspects of the disclosure. This summary is not an extensive overview of the disclosure. It is not intended to identify key/critical elements or to delineate the scope of the disclosure. Its sole purpose is to present some concepts of the disclosure in a simplified form as a prelude to the more detailed description that is presented later.

Various embodiments of the present disclosure provide a case for storing outdoor power equipment, comprising: a top portion; and a bottom portion movably connected to the top portion, wherein the bottom portion has one or more openings to allow one or more wheels of an outdoor power equipment to protrude through the one or more openings; wherein the top portion and the bottom portion are configured to substantially enclose the outdoor power equipment in a closed configuration.

Further embodiments of the present disclosure provide a lawn maintenance device, comprising: a plurality of wheels; a mow deck; and a handle, wherein the handle is configured alternately to be in an operating position or in a storage position, wherein in the storage position the handle is contracted and folded over the mow deck, and wherein in the operating position the handle is extended behind the mow deck.

To accomplish the foregoing and related ends, certain illustrative aspects of the disclosure are described herein in connection with the following description and the drawings. These aspects are indicative, however, of but a few of the various ways in which the principles of the disclosure can be employed and the subject disclosure is intended to include all such aspects and their equivalents. Other advantages and features of the disclosure will become apparent from the following detailed description of the disclosure when considered in conjunction with the drawings.

BRIEF DESCRIPTION OF THE DRAWINGS

The foregoing and other aspects of the present disclosure will become apparent to those skilled in the art to which the present disclosure relates upon reading the following description with reference to the accompanying drawings, in which.

Figure 1:
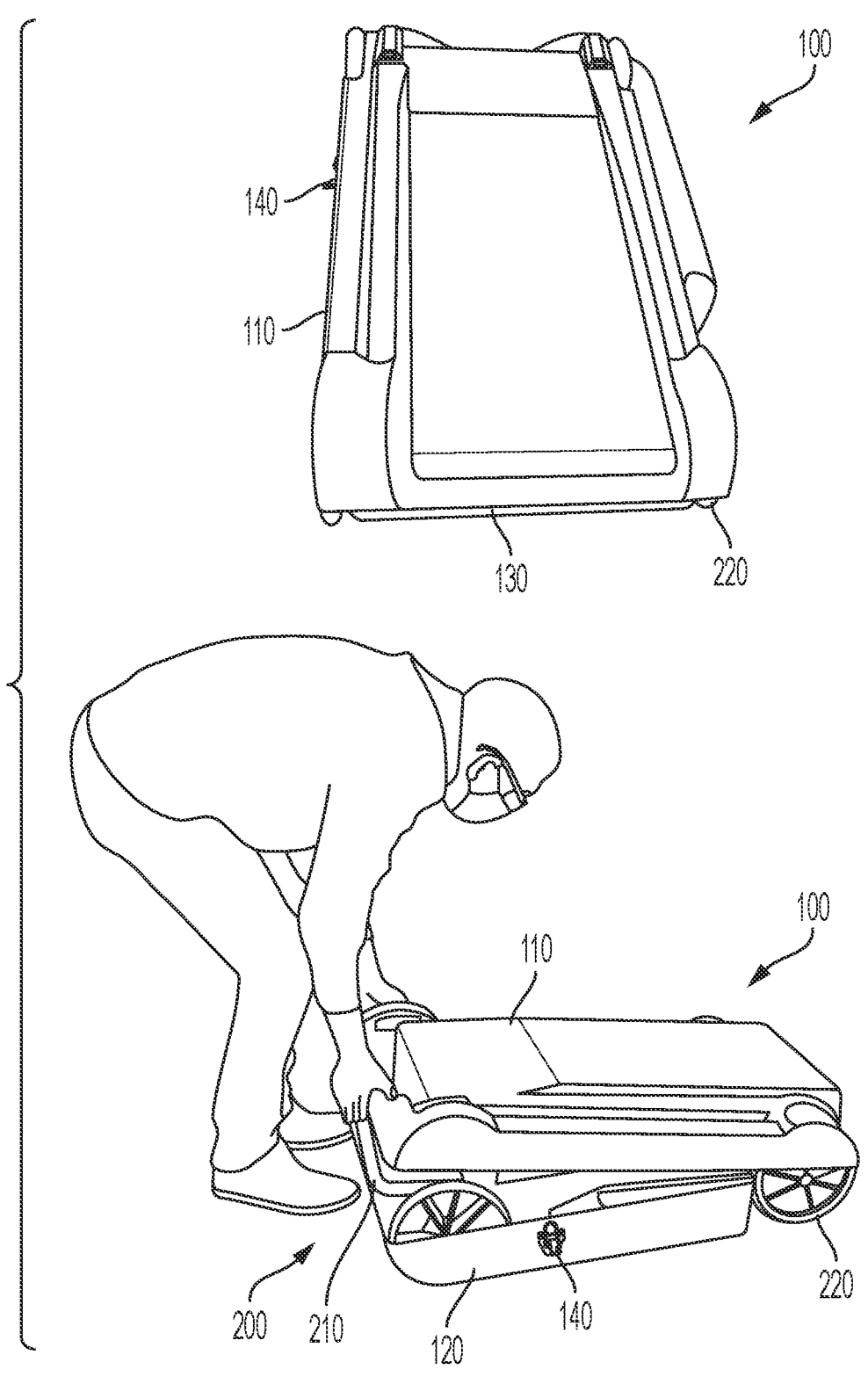
FIG. 1 illustrates two images of first example embodiment of a case for packing, storage, and/or charging of an outdoor power equipment, in a closed form (top image) and a partially opened form (bottom image), according to various aspects discussed herein.

It should be noted that the drawings are diagrammatic and not drawn to scale. Relative dimensions and proportions of parts of the figures have been shown exaggerated or reduced in size for the sake of clarity and convenience in the drawings. The same reference numbers are generally used to refer to corresponding or similar features in the different embodiments, except where clear from context that same reference numbers refer to disparate features. Accordingly, the drawings and description are to be regarded as illustrative in nature and not as restrictive.

While various specific embodiments of the disclosure are described herein, it should be understood that the disclosed embodiments are not so limited and modifications may be made without departing from the scope of the present disclosure. The scope of the embodiments are defined by the appended claims, and all devices, processes, and methods that come within the meaning of the claims, either literally or by equivalence, are intended to be embraced therein.

DETAILED DESCRIPTION

The following terms are used throughout the description, the definitions of which are provided herein to assist in understanding various aspects of the subject disclosure.

As used in this application, the terms "outdoor power equipment", "outdoor power equipment machine", "power equipment", "maintenance machine" and "power equipment machine" are used interchangeably and are intended to refer to any of robotic, partially robotic ride-on, walk-behind, sulky equipped, autonomous, semi-autonomous (e.g., user-assisted automation), remote control, or multi-function variants of any of the following: powered carts and wheel barrows, lawn mowers, lawn and garden tractors, lawn trimmers, lawn edgers, lawn and leaf blowers or sweepers, hedge trimmers, pruners, loppers, chainsaws, rakes, pole saws, tillers, cultivators, aerators, log splitters, post hole diggers, trenchers, stump grinders, snow throwers (or any other snow or ice cleaning or clearing implements), lawn, wood and leaf shredders and chippers, lawn and/or leaf vacuums, pressure washers, lawn equipment, garden equipment, driveway sprayers and spreaders, and sports field marking equipment.

Various embodiments comprise assemblies, apparatuses, and methods for packing, storing, and/or charging outdoor power equipment (e.g., a lawn maintenance device, etc.) and/or outdoor power equipment configured to operate with such assemblies, apparatuses, and/or methods.

FIGS. 1 through 10 illustrate example images of a first example embodiment 100 of a case that can be employed for packing, storage, and/or charging of an outdoor power equipment 200 such as a lawn maintenance device, according to various aspects discussed herein. FIG. 1 illustrates two images of first example embodiment 100, in a closed form (top image) and a partially opened form (bottom image), according to various aspects discussed herein. In various example embodiments shown in the figures, outdoor power equipment 200 is a walk-behind mower as one specific example, but various embodiments of a case such as first example embodiment 100 can be employed in connection with any of a variety of outdoor power equipment.

Outdoor power equipment 200 can be shipped in a case such as first example embodiment 100, which optionally can be supplemented in various embodiments by a relatively small amount of disposable packaging (e.g., a cardboard wrapper or sleeve, plastic wrap, etc.) when compared with existing outdoor power equipment. First example embodiment 100 can substantially enclose outdoor power equipment 200 during shipping and provide protection from incidental impacts that may occur during shipping.

First example embodiment 100 comprises a top portion 110 and a bottom portion 120 that are connected via a hinge 130 allowing movement of top portion 110 and bottom portion 120 relative to one another to open or close first example embodiment 100. Other embodiments (e.g., second example embodiment 400 discussed below in connection with FIGS. 11-13, etc.) can comprise a different number of portions that can be connected and movable relative to one another to open or close the case, or can comprise one or more disconnected portions (e.g., wherein top portion 110 is separate from and able to be pulled or lifted away from bottom portion 120, etc.).

Top portion 110 and/or bottom portion 120 can comprise one or more fasteners 140 (e.g., with top portion 110 comprising first portion(s) of one or more fasteners 140 configured to engage with second portions(s) of fastener(s) 140, and/or vice versa, etc.) to facilitate securing top portion 110 and bottom portion 120 to one another (e.g., for shipping, storage, and/or user transportation of outdoor power equipment 200, etc.). While top portion 110 and bottom portion 120 are referred to as "top" and "bottom," the case and portions 110 and 120 can have any orientation, although orienting the case with bottom portion 120 flat on the ground or other surface and top portion 110 above bottom portion 120 coincides with an upright orientation (with its wheels on the bottom, etc.) of outdoor power equipment 200 when within the case.

Figure 2:
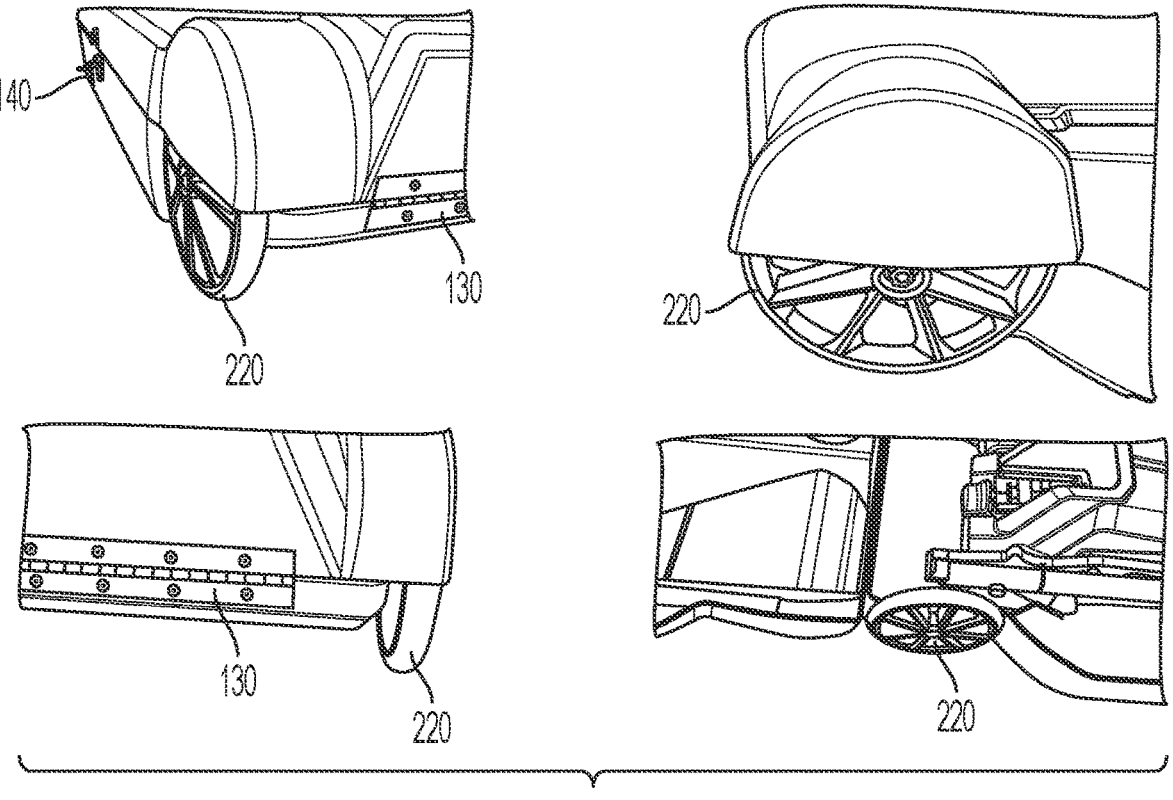
FIG. 2 illustrates four images showing exposed wheels of outdoor power equipment while in the first example embodiment of the case, according to various aspects discussed herein.
Figure 12:
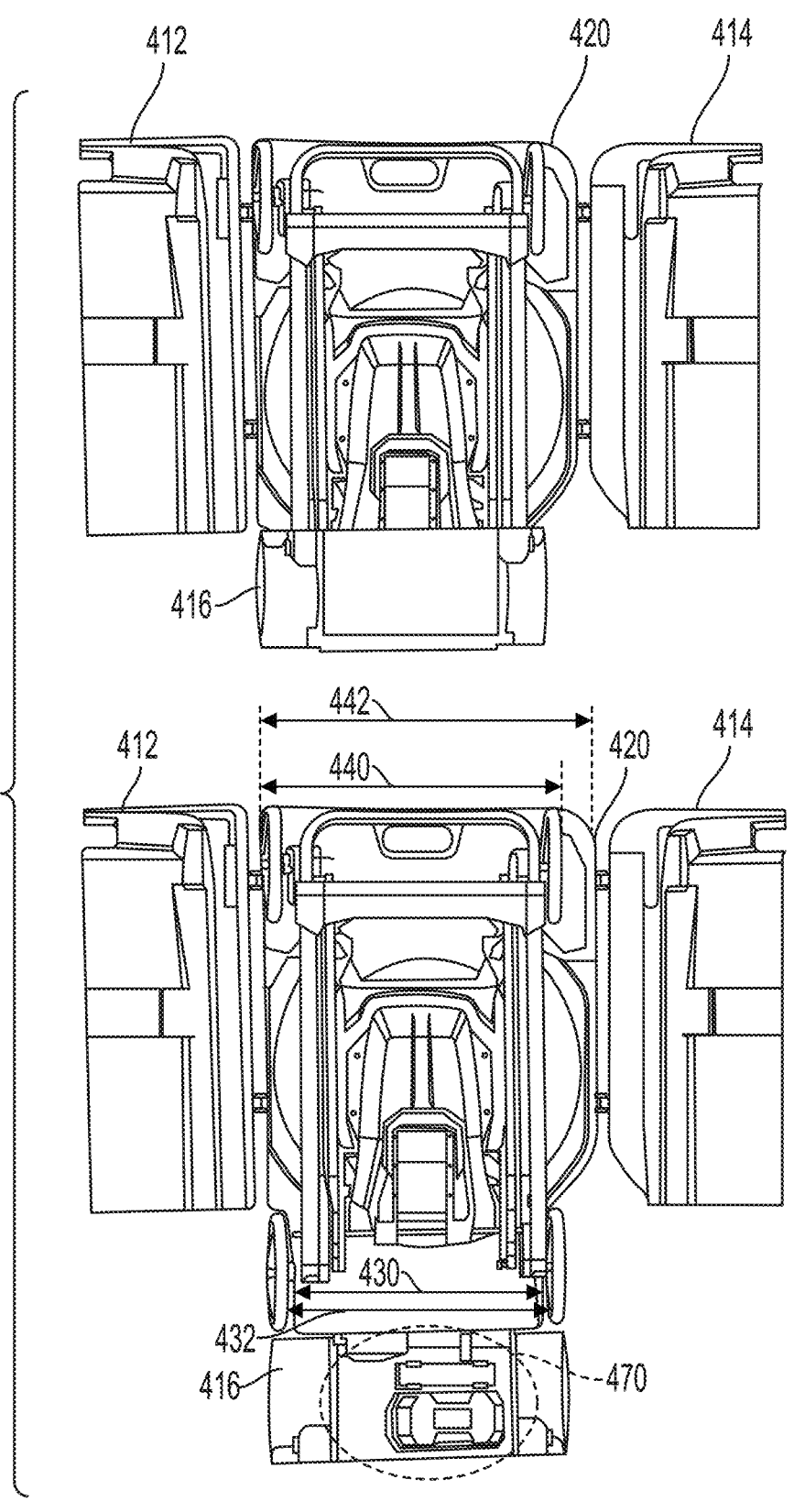
FIG. 12 illustrates two additional images of a second example embodiment of a case for packing, storing, transporting, and/or charging an outdoor power equipment, in connection with various aspects discussed herein.

While the case can substantially enclose outdoor power equipment 200, various embodiments (e.g., including first example embodiment 100, as shown in FIG. 1) can have one or more openings through which at least a portion of one or more wheels 220 of outdoor power equipment 200 can protrude and/or be exposed (e.g., both rear wheels of outdoor power equipment 200 in first example embodiment 100, although various embodiments can leave exposed different wheel(s), which can be more or fewer wheels (or none), etc.), such that the exposed wheel(s) can be used to roll the combination of the case and outdoor power equipment 200 when secured within the case, to facilitate ease of transportation of the combination. Exposed portions of wheels 220 can be seen in FIG. 1, along with (in the bottom image) the collapsed and folded handle 210 of outdoor power equipment 200. Referring to FIG. 2, illustrated are four images showing exposed wheels 220 of outdoor power equipment 200 while in first example embodiment 100 of the case, according to various aspects discussed herein. In some embodiments, as is evident in FIG. 2 and more explicitly in FIG. 12, bottom portion 120 can have a first width 442 larger than the exterior track width 440 across outer edges of a left and right wheel of outdoor power equipment 200 and can taper down to a narrow width 430 that is smaller than an interior track width 432 between inner edges of a second left and second right wheel (whether front or rear wheels) as shown in FIG. 12. This interior track width 432 can define the opening(s) in bottom portion 120 for one or more wheels 220 to protrude and/or be exposed. Conversely, top portion 110 can have a width(s) that extends across the exterior track width 440 of the left and right wheel and the second left and second right wheel. Alternatively, some embodiments of the case can fully enclose wheels 220 and optionally employ separate wheels as part of the case (or optionally omit wheels).

Figure 3:
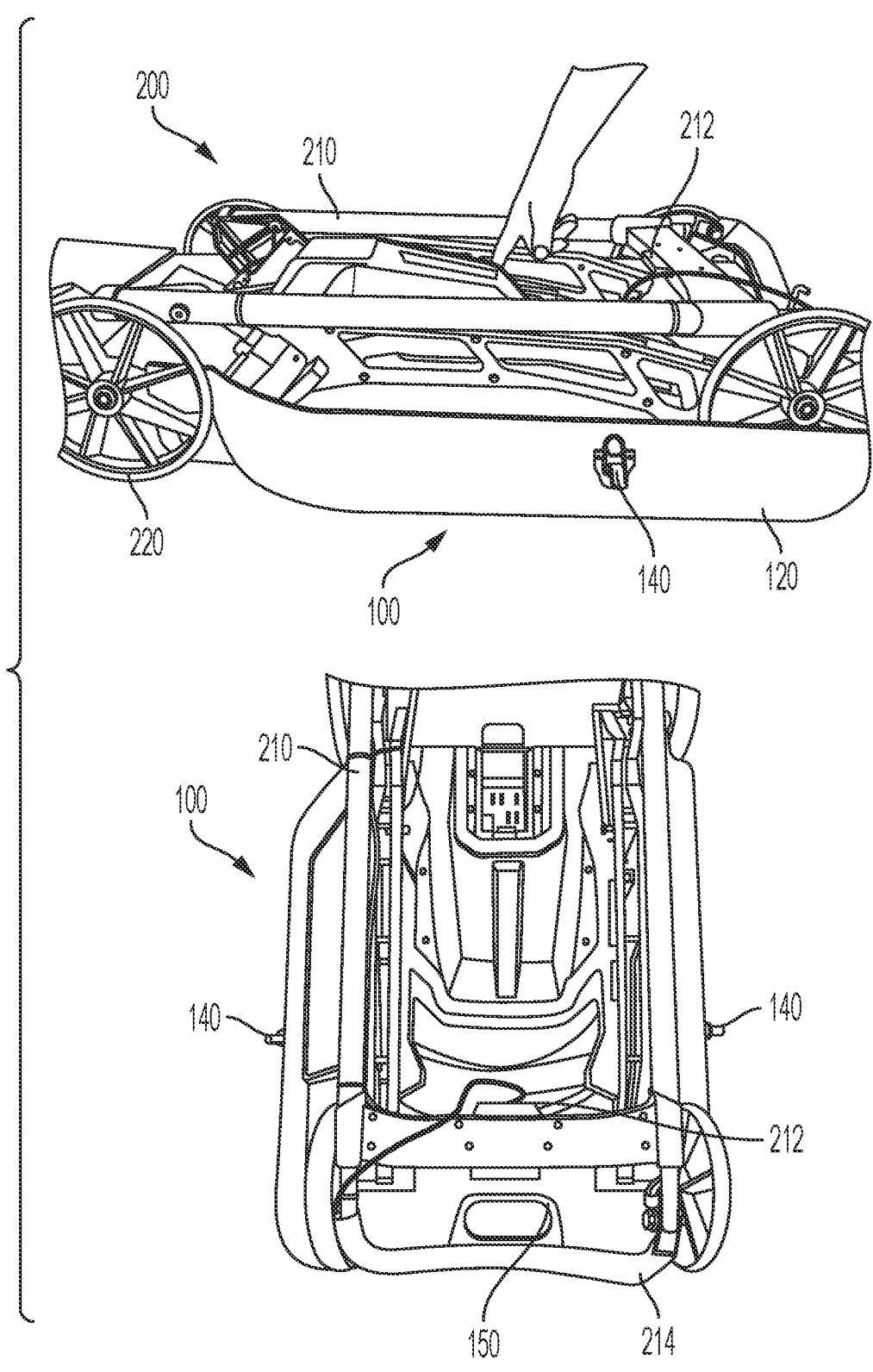
FIG. 3 illustrates two images showing an outdoor power equipment stored within the first example embodiment of the case, in connection with various aspects discussed herein.

Referring to FIG. 3, illustrated are two images showing an outdoor power equipment 200 stored within the first example embodiment 100 of the case, in connection with various aspects discussed herein. As can be seen in FIG. 3, outdoor power equipment can be arranged into a storage configuration for placement and storage in the case. In the illustrated embodiment, the handle 210 of outdoor power equipment 200 can be a telescoping handle that can extend for operation (e.g., mowing, etc.), and can collapse and be folded forward over the body (e.g., motor, mow deck, etc.) of outdoor power equipment 200 for storage in the case. The example embodiment shown for outdoor power equipment 200 comprises a button 212 on the handle 210 that can be gripped by a user to allow the user to extend or collapse handle 210 and internal plungers in handle 210 that will only allow handle 210 to fold forward when the handle 210 is fully collapsed, but any of a variety of alternative mechanisms (e.g., screws/bolts, knobs, switches, etc.) can be employed to extend/collapse and/or fold/unfold handle 210, as well as to lock handle 210 into an operating position. The case can comprise a handle 150 for lifting and/or supporting while rolling the case. In the first example embodiment 100, handle 150 and handle 210 are arranged such that a grip portion 214 of handle 210 is within a gripped portion of handle 150 when outdoor power equipment 200 is stored within the case. Additionally, in various embodiments of outdoor power equipment 200, an in-line reed switch (or other mechanism, etc.) can be incorporated inside handle 210 such that outdoor power equipment 200 can only be operated when handle 210 is unfolded and extended (e.g., which can align the reed switch with a magnet, etc.).

Figure 4:
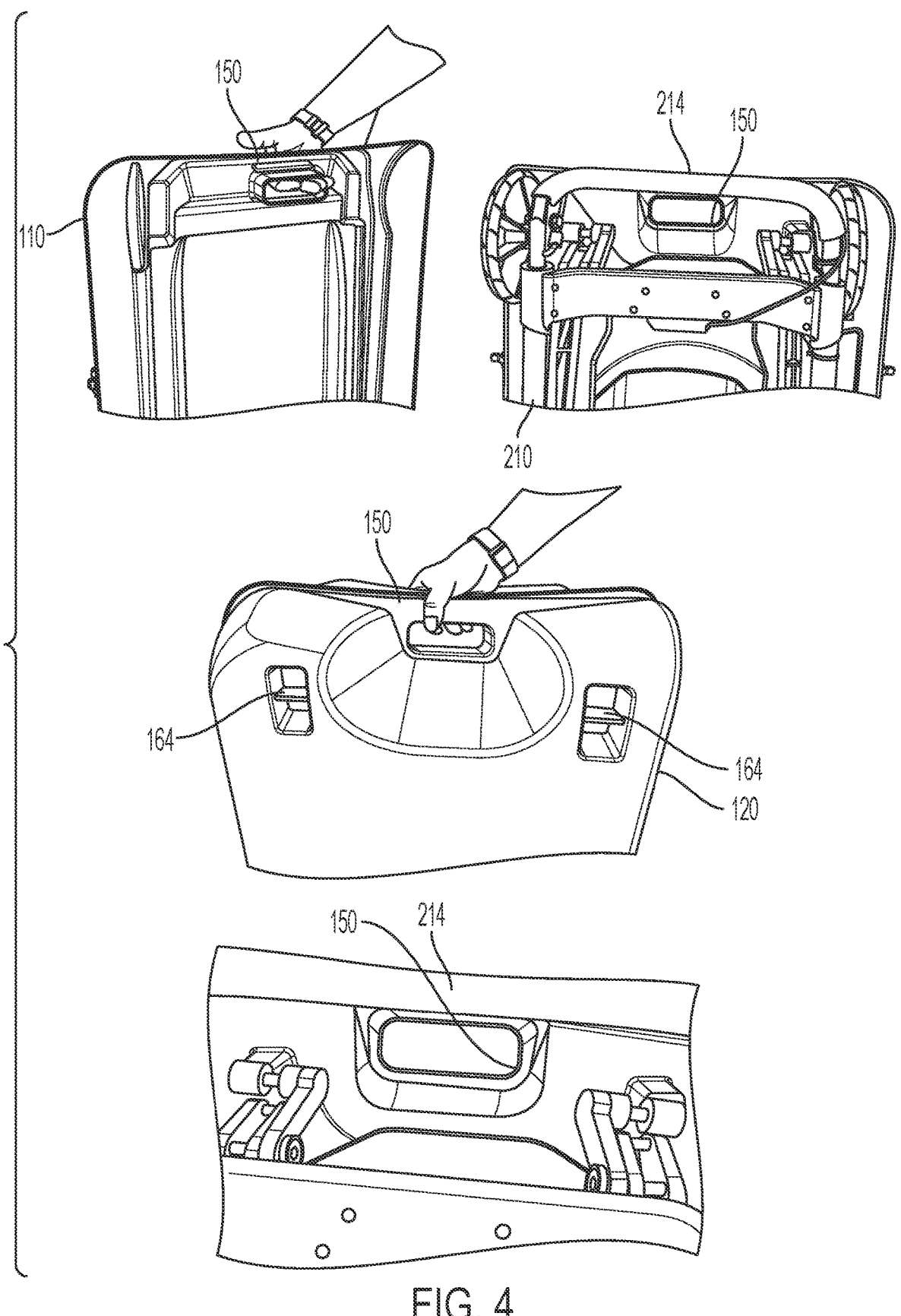
FIG. 4 illustrates four images showing the handle of the first example embodiment, in connection with various aspects discussed herein.

Referring to FIG. 4, illustrated are four additional images showing the handle 150 of the first example embodiment 100, in connection with various aspects discussed herein. The top left image shows the top portion 110 and the half of the handle 150 that is a part of top portion 110. The two right images show the bottom portion 120 with outdoor power equipment 200 and the portion of handle 150 in the bottom portion 120 of the case. The bottom left image shows the bottom portion 120, along with rods or pins 164 that can be used for hanging the case from hooks on a wall. In various embodiments, pins 164 can be spaced approximately 16" apart, the typical spacing between wall studs.

Figure 5:
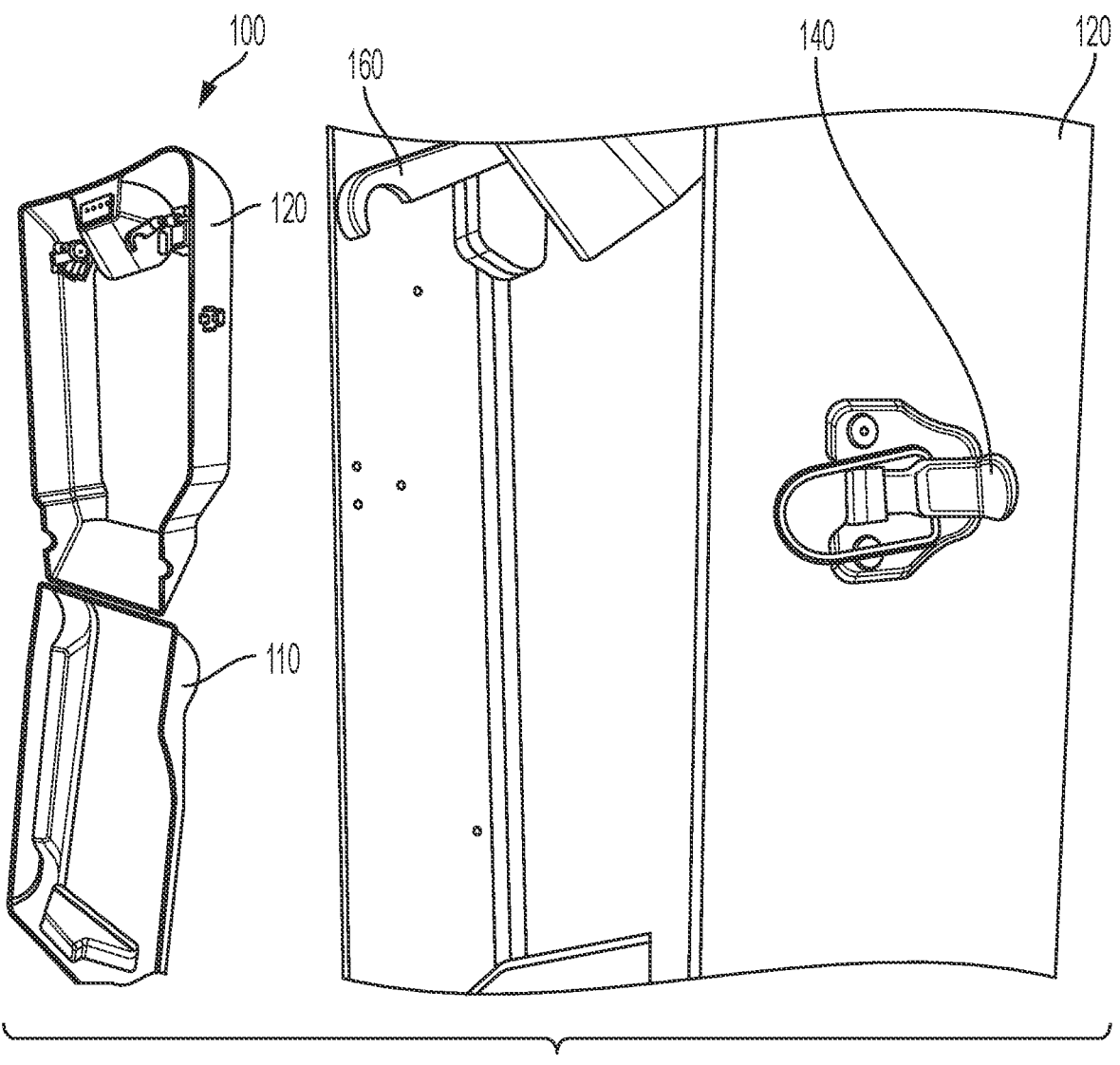
FIG. 5 illustrates two images showing the first example embodiment of the case hung on a wall, in connection with various aspects discussed herein.

Referring to FIG. 5, illustrated are two images showing the first example embodiment 100 of the case hung on a wall, in connection with various aspects discussed herein. FIG. 5 also shows a pair of clips 160 (both are visible in the left image; one is labeled in the right image) of the case that can be used to secure outdoor power equipment 200 within the case in a variety of orientations. Although FIG. 5 shows the first example embodiment 100 hung open on a wall without outdoor power equipment 200, it can also be hung on a wall while closed and/or containing outdoor power equipment 200 (e.g., to hook(s) securely attached to a wall, such as a pair of hooks mounted on wall studs, etc.). The first example embodiment weighs approximately 13.5 pounds, the example embodiment of outdoor power equipment 200 shown in the figures weighs approximately 38 pounds, and the example battery and charger illustrated in the drawings and discussed below weigh approximately 6 pounds combined, for a total weight of around 51.5 pounds. Alternatively, the case (with or without outdoor power equipment 200 inside) can be stored upright (e.g., with the handle 150 at the top), on the bottom portion 120 (or on top portion 110, etc.), etc.

Figure 6:
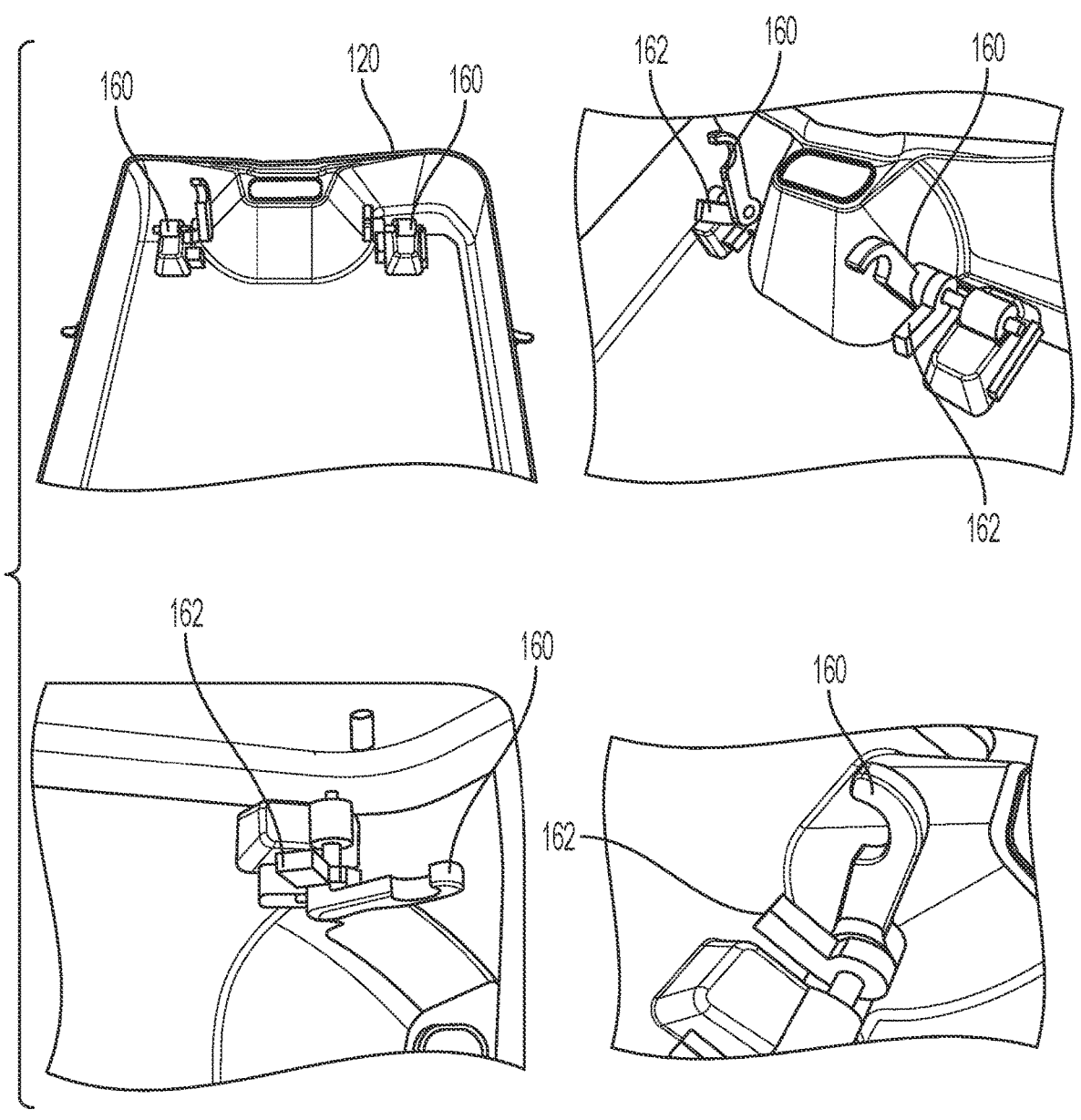
FIG. 6 illustrates four images showing the pair of clips in the bottom portion of the first example embodiment of the case, according to various aspects discussed herein.
Figure 7:
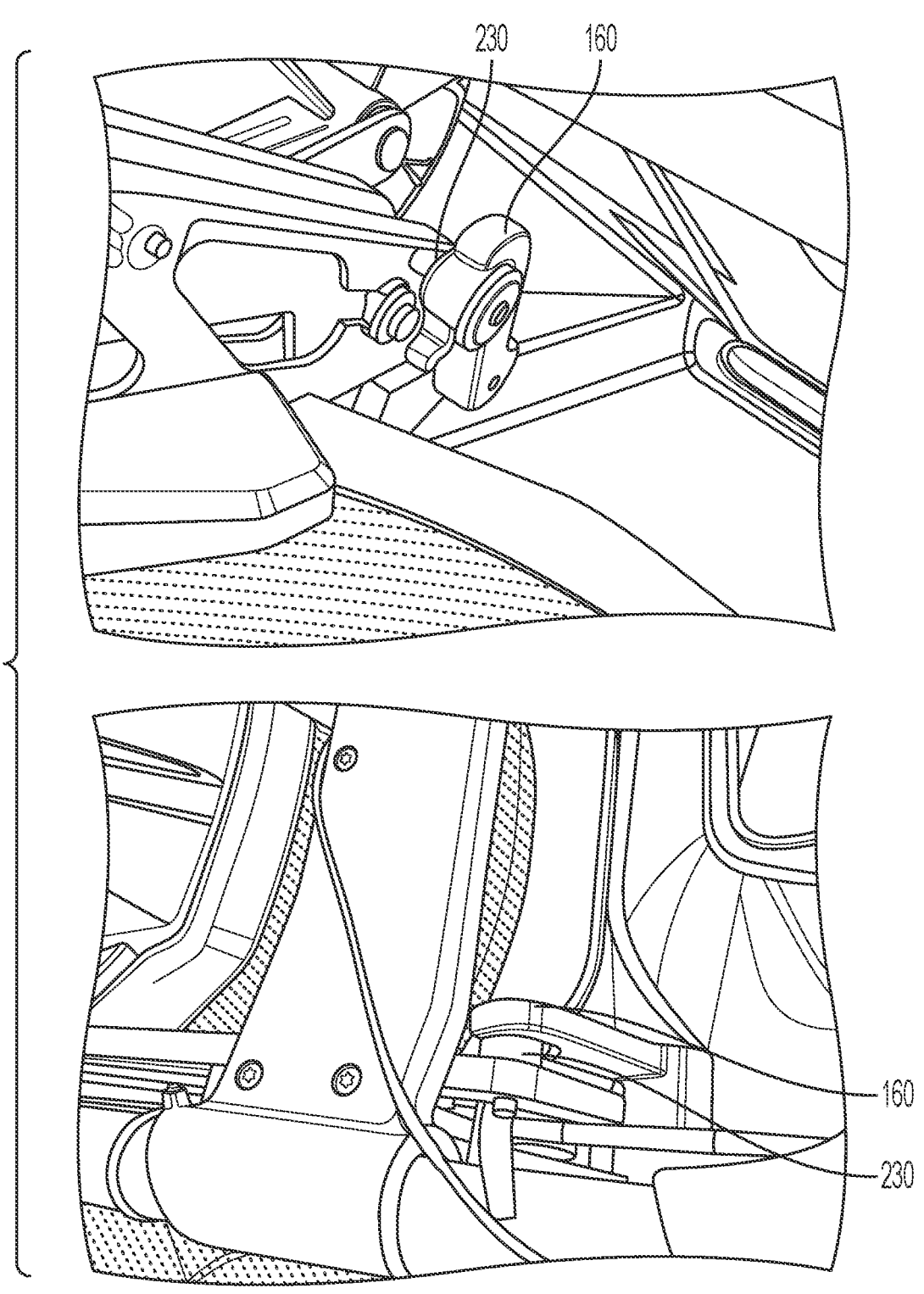
FIG. 7 illustrates two images showing the clips of the first example embodiment of the case engaged with pegs of the outdoor power equipment to secure the outdoor power equipment in the case, according to various aspects discussed herein.

Referring to FIG. 6, illustrated are four images showing the pair of clips 160 in the bottom portion 120 of the first example embodiment 100 of the case, according to various aspects discussed herein. Referring to FIG. 7, illustrated are two images showing the clips 160 of the first example embodiment 100 of the case engaged with pegs 230 of the outdoor power equipment 200 to secure outdoor power equipment 200 in the case, according to various aspects discussed herein. As can be seen in FIG. 6, each of the clips 160 can be attached to and rotatable around a pin (e.g., which can be a pin 164, as shown in FIG. 4, etc.). Additionally, a lever arm 162 can also be attached to and rotatable around the same pin as the clip(s) 160. When outdoor power equipment 200 is placed in the case, the front end (or the back end, in other embodiments) of outdoor power equipment 200 can push down the lever arm(s) 162, causing the clips 160 to rotate and engage with pegs 230, as shown in FIG. 7, holding outdoor power equipment 200 securely within the case. The clips 160 can securely hold the outdoor power equipment 200 in a vertical orientation, as well, such as that of first example embodiment 100 in FIG. 5, upright on a floor, etc. By lifting up on the front end of outdoor power equipment 200, the clips 160 can be disengaged from outdoor power equipment 200, which then can be removed from the case.

Figure 8:
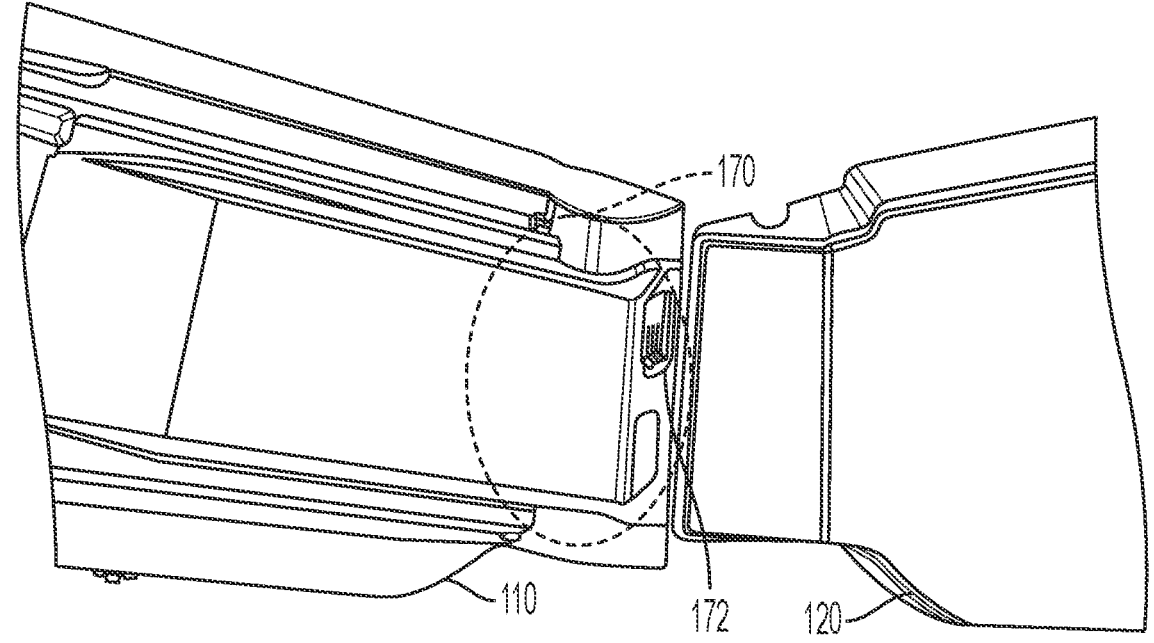
FIG. 8 illustrates an image of the first example embodiment of the case, showing a storage area that can be used for storing a battery, charger, and/or other accessories for outdoor power equipment, in connection with various aspects discussed herein.
Figure 9:
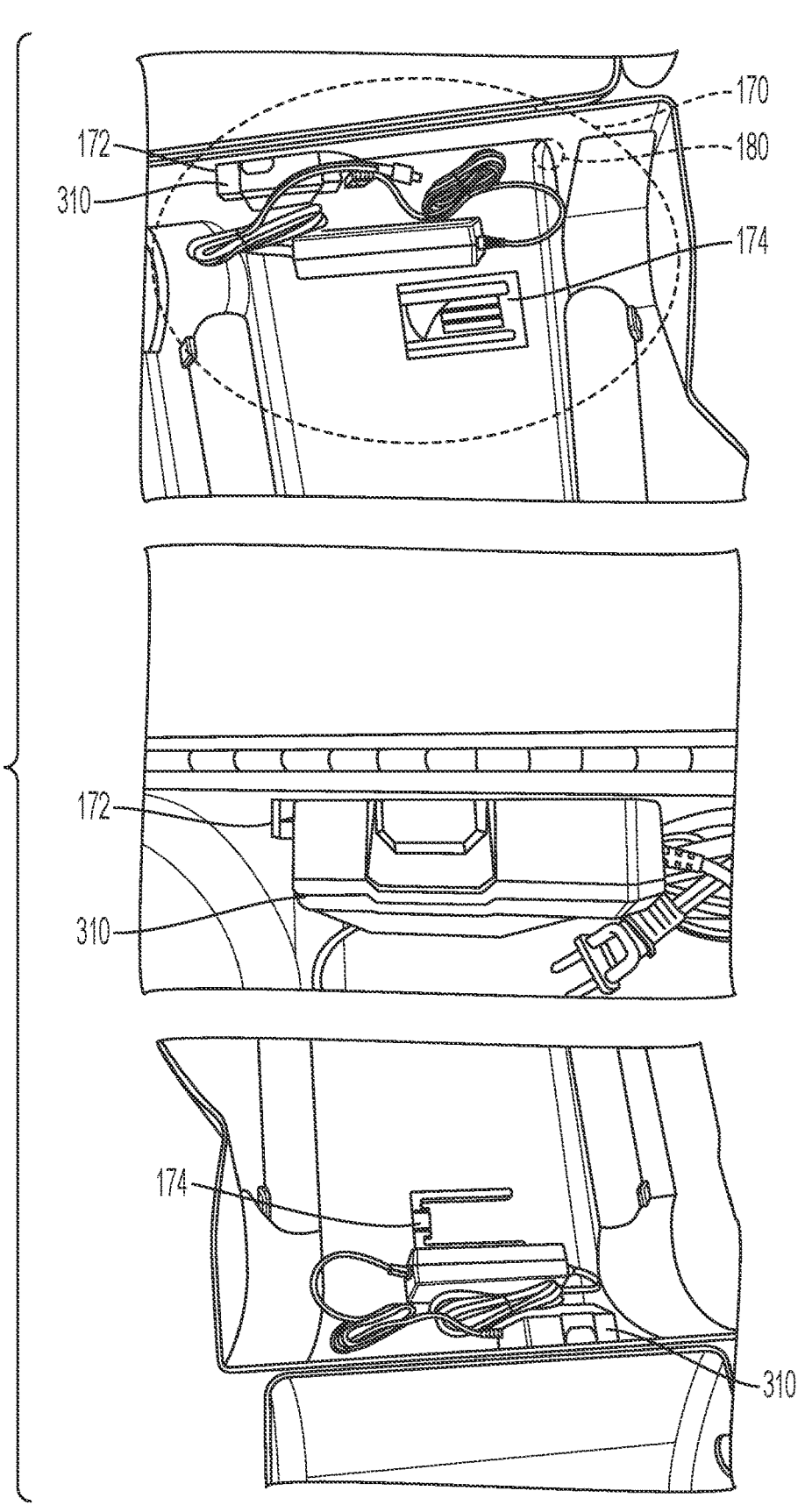
FIG. 9 illustrates three images showing a battery charger engaged with a charger storage dock and a battery storage dock, in connection with various aspects discussed herein.
Figure 10:
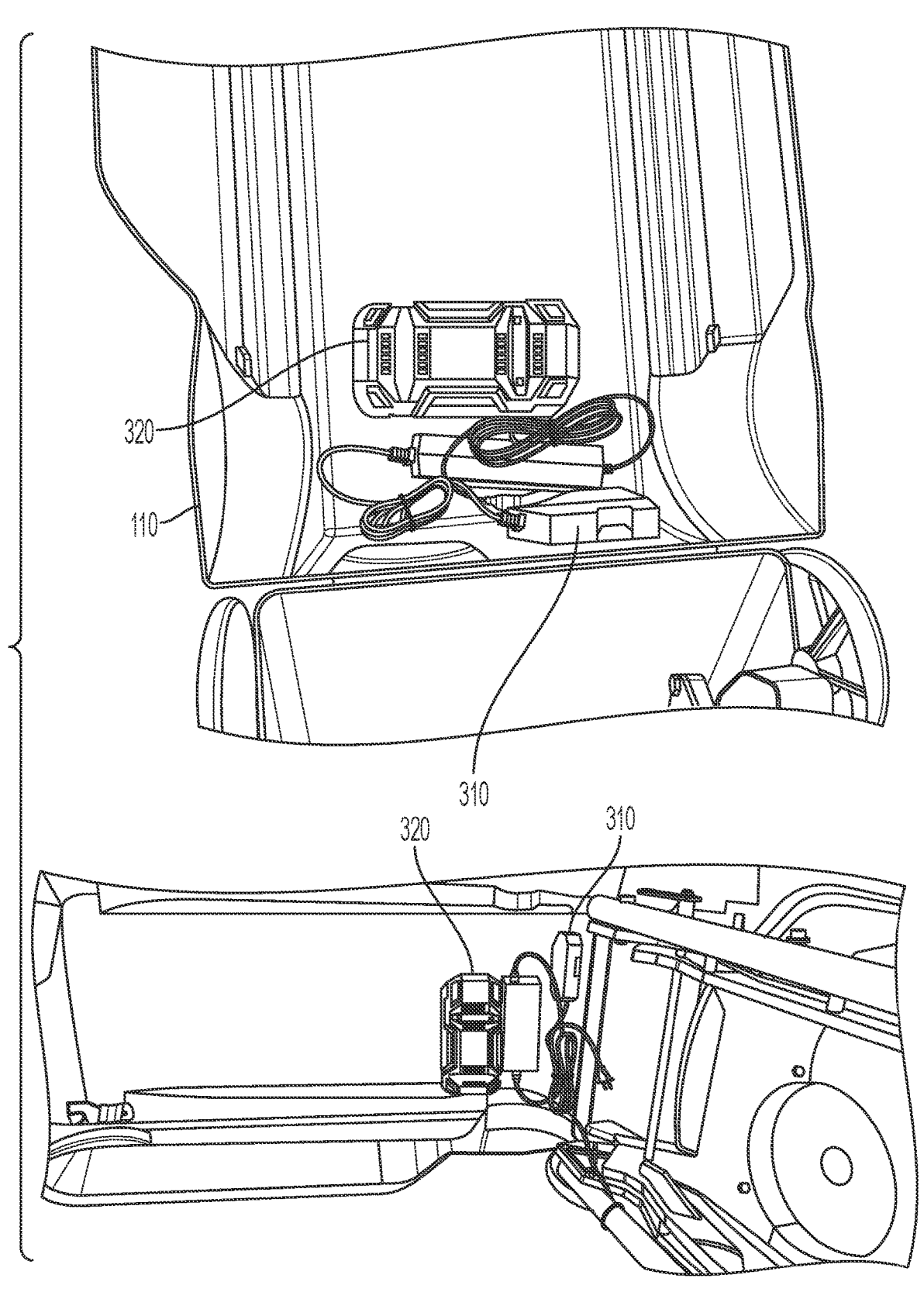
FIG. 10 illustrates two images showing a battery and battery charger engaged with a battery storage dock and charger storage dock, respectively, in connection with various aspects discussed herein.

Referring to FIG. 8, illustrated is an image of the first example embodiment 100 of the case, showing a storage area 170 that can be used for storing a battery, charger, and/or other accessories for outdoor power equipment 200, in connection with various aspects discussed herein. Referring to FIG. 9, illustrated are three images showing a battery charger 310 engaged with a charger storage dock 172 and a battery storage dock 174, in connection with various aspects discussed herein. Referring to FIG. 10, illustrated are two images showing a battery 320 and battery charger 310 engaged with a battery storage dock 174 and charger storage dock 172, respectively, in connection with various aspects discussed herein.

A region of the case such as storage area 170 can be used for storage of the battery 320 and charger 310 (for electric embodiments such as the example embodiment of outdoor power equipment 200) and/or other accessories for the outdoor power equipment 200. Various embodiments can locate this region close to an end of the case opposite the handle 150, which can be substantially flat and near exposed portions of wheel(s) 220, thereby lowering the center of gravity of the case when containing the battery, charger, and/or other accessories, thereby facilitating rolling (on wheel(s) 220, etc.) and/or upright storage of the case. Storage area 170 can comprise one or more storage docks such as charger storage dock 172, battery storage dock 174, and/or one or more accessory storage docks, which can be used to secure a charger 310, battery 320, and/or one or more accessories during shipping and/or transportation (e.g., by a user, etc.). The dimensions of the first example embodiment are approximately 23.5"×36.5"×9.5", which can easily fit inside of the trunk or back seat of a car, etc. The dimensions of various embodiments can depend on the size of the outdoor power equipment stored therein, but will still take up significantly less space than the same outdoor power equipment in a non-collapsed configuration for operation.

In various embodiments, one or more openings 180 (e.g., holes, slots, etc.) can be included in the top portion 110 or bottom portion 120 (e.g., near the curve of the wheel as indicated in FIG. 9 and/or at another location, etc.) through which a wire of charger 310 can be placed, such that charger 310 can be connected to an outlet while within the case along with the outdoor power equipment.

Figure 11:
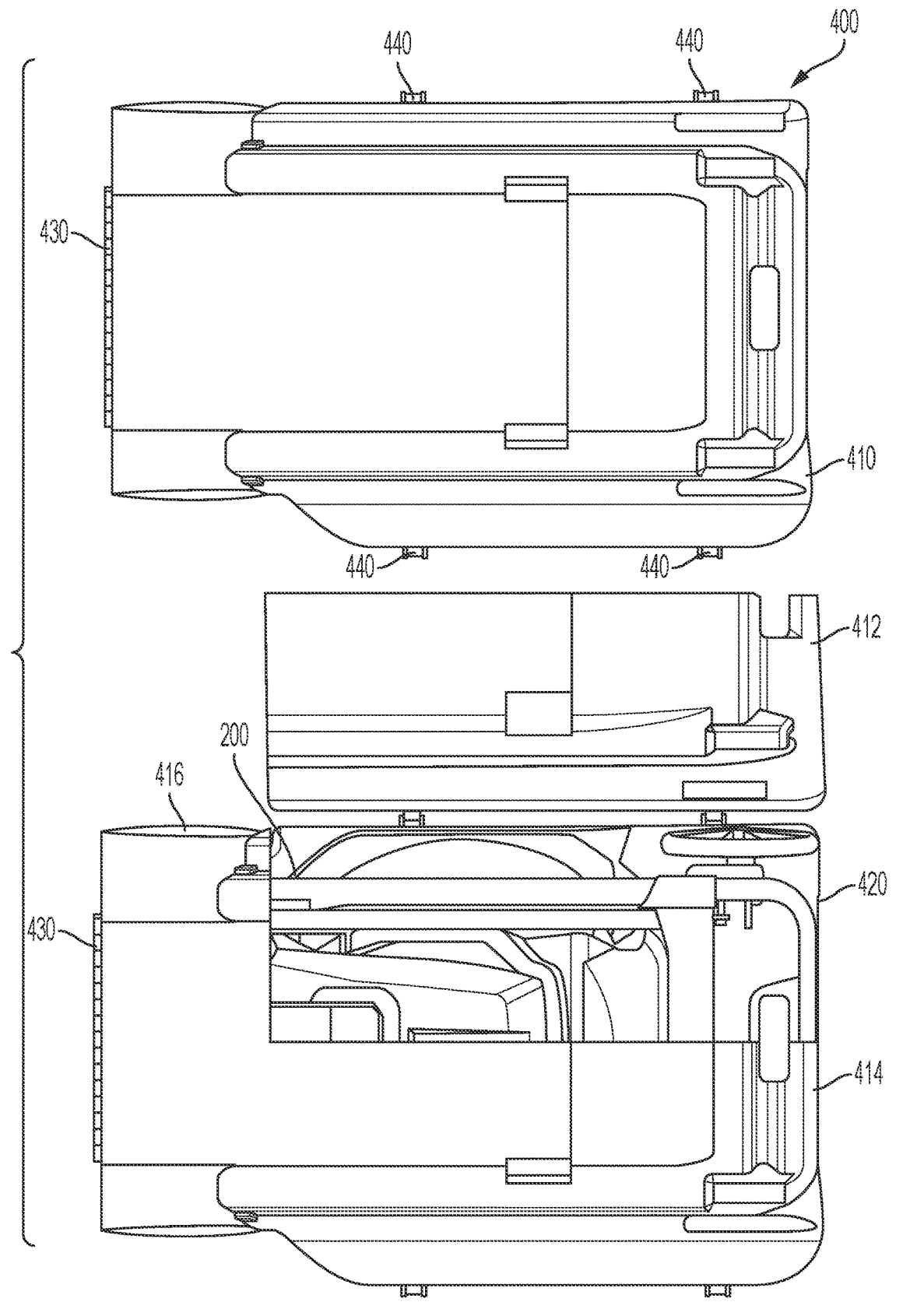
FIG. 11 illustrates two images of a second example embodiment of a case for packing, storing, transporting, and/or charging an outdoor power equipment, in connection with various aspects discussed herein.
Figure 13:
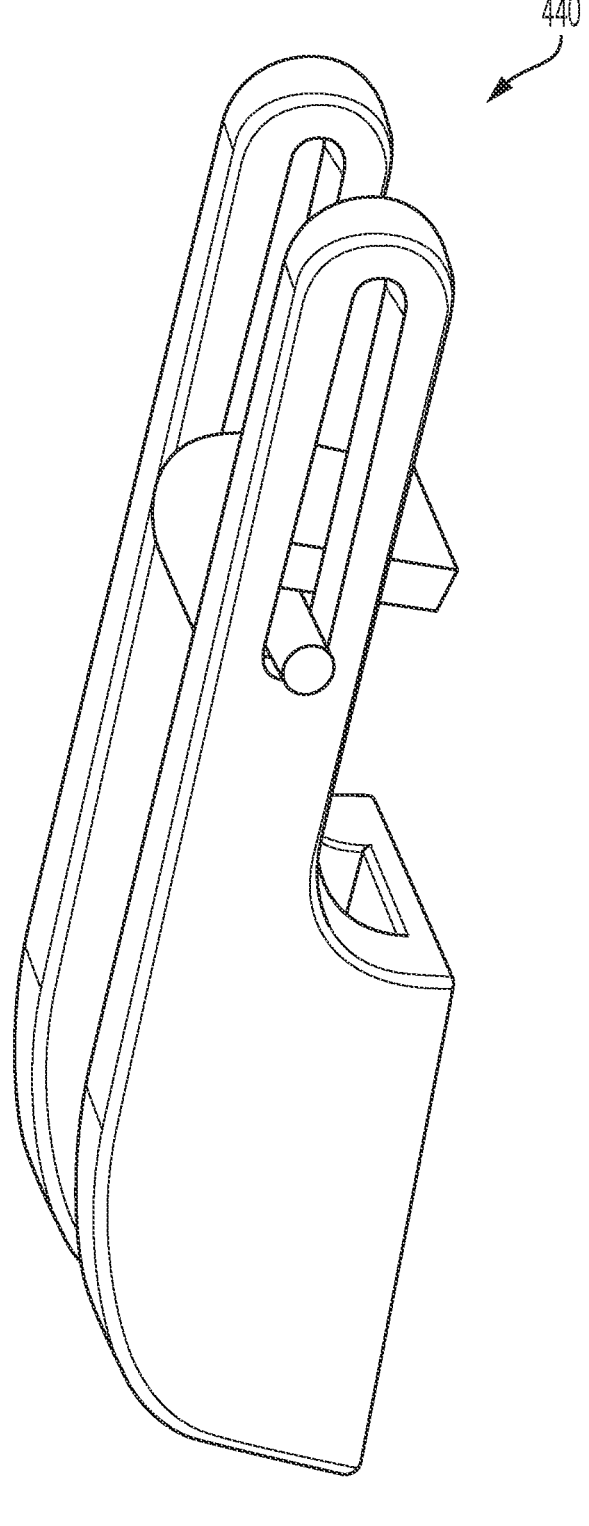
FIG. 13 illustrates an image of an example hinge that can allow two pieces to rotate and move closer and/or further from one another, in connection with various aspects discussed herein.

Referring to FIG. 11, illustrated are two images of a second example embodiment 400 of a case for packing, storing, transporting, and/or charging an outdoor power equipment 200, in connection with various aspects discussed herein. Referring to FIG. 12, illustrated are two additional images of a second example embodiment 400 of a case for packing, storing, transporting, and/or charging an outdoor power equipment 200, in connection with various aspects discussed herein. Second example embodiment 400 can be similar to first example embodiment 100, but top portion 410 can comprise two or more pieces that can fold outward away from one another to open (e.g., 412, 414, and 416, etc.). Some pieces can be attached to a bottom portion 420 via hinges such as hinge 430, which can be similar to hinge 130. Other pieces can be attached to bottom portion 420 via hinges such as hinges 440, which can allow the piece to be lifted and/or pulled away from bottom portion 420 before rotating open, so as to avoid interference with part of outdoor power equipment 200 (e.g., wheels, etc.). Referring to FIG. 13, illustrated is an image of an example hinge 440 that can allow two pieces to rotate and move closer and/or further from one another, in connection with various aspects discussed herein. In various embodiments, lips (e.g., plastic, rubber, etc.) can be included on various pieces (e.g., 412, 414, 416, etc.) to provide for an improved seal when closed.

Various embodiments of outdoor power equipment 200 can have several additional features, as discussed below, and some of which are shown on the example embodiment (e.g., the push mower) of outdoor power equipment 200 in the Figures. Mower embodiments of outdoor power equipment 200 can comprise a manual deck lift that can be controlled via a single lever on the left side or the right side of the mower, and springs can be included to assist a user employing the manual deck lift.

The mow deck or mow chamber of various embodiments can be of any of a variety of designs. For example, the mow deck/chamber can be a relatively short, high efficiency mow deck/chamber, such as that shown in the Figures, and can be part of a high efficiency mower that can have improved efficiency resulting from quickly cutting grass and rapidly discharging cut grass. The high efficiency mow deck/chamber can provide 360° discharge below the mow deck/chamber. The example embodiment of outdoor power equipment 200 shown in the Figures can achieve a runtime of over 2 hours and 30 minutes at around 2300 revolutions per minute with the example battery 320.

In various embodiments, the mow deck/chamber of the outdoor power equipment 200 can be offset from a symmetric position relative to the wheels of the outdoor power equipment 200 (wherein the direction of offset can depend on the direction of rotation of the mower blade(s)), which can ensure that grass that is potentially pushed flat on a first pass of the mower can be cut after turning on a second pass adjacent to the first pass.

Additionally or alternatively, some features can of the outdoor power equipment 200 can differ from those of those of the example embodiment. For example, although the example embodiment of outdoor power equipment 200 has a split front axle, various embodiments can employ complete front axles. As noted above, electric or gas mowers can be employed in connection with embodiments discussed herein. As another example, a deeper mow deck/chamber can be provided than the one of the example embodiment of outdoor power equipment 200 in the Figures (e.g., 1 inch to 1.5 inches deeper than the example embodiment of outdoor power equipment 200, such as 1.25 inches deeper, etc.), which can cut grass for longer, providing greater mulching. Additionally or alternatively, different blade(s) can be employed for lifting and bagging of grass (e.g., as opposed to the 360° discharge on the example embodiment of outdoor power equipment 200, etc.).

Additionally, although not shown in the Figures, various mower embodiments can employ a flexible (e.g., rubber, etc.) trailer sheet behind the mow deck/chamber, which can comprise a plurality of individually movable sections to fluff grass back up and hide grass clippings, by being dragged over the grass. In various embodiments, individually movable sections can be weighted (e.g., with metal rods on their ends, etc.) to improve the ability to fluff the grass and hide grass clippings.

In regard to the various functions performed by the above described components, machines, devices, processes and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments include a system as well as electronic hardware configured to implement the functions, or a computer-readable medium having computer-executable instructions for performing the acts or events of the various processes.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In other embodiments, combinations or sub-combinations of the above disclosed embodiments can be advantageously made. Moreover, embodiments described in a particular drawing or group of drawings should not be limited to those illustrations. Rather, any suitable combination or subset of elements from one drawing(s) can be applied to other embodiments in other drawings where suitable to one of ordinary skill in the art to accomplish objectives disclosed herein, known in the art, or reasonably conveyed to one of ordinary skill in the art by way of the context provided in this specification. Where utilized, block diagrams of the disclosed embodiments or flow charts are grouped for ease of understanding. However, it should be understood that combinations of blocks, additions of new blocks, re-arrangement of blocks, and the like are contemplated in alternative embodiments of the present disclosure.

Based on the foregoing it should be understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A case for storing outdoor power equipment, comprising:

a top portion; and a bottom portion movably connected to the top portion, wherein the bottom portion has one or more openings to allow one or more wheels of an outdoor power equipment to protrude through the one or more openings, wherein the bottom portion defines a first width that is larger than an exterior track width extending across outer edges of left and right wheels of the outdoor power equipment and defines a second width near the one or more wheels that is narrower than an interior track width extending between interior edges of the one or more wheels to define the one or more openings in the bottom portion;

wherein the top portion and the bottom portion are configured to substantially enclose the outdoor power equipment in a closed configuration.

2. The case of claim 1, wherein the bottom portion comprises one or more pins or rods that can support the case when suspended from the one or more pins or rods.

3. The case of claim 2, wherein the one or more pins or rods comprise two pins spaced approximately 16 inches apart.

4. The case of claim 1, wherein the one or more openings are configured to align with a pair of rear wheels of the outdoor power equipment.

5. The case of claim 1, wherein the bottom portion is movably connected to the top portion via a hinge aligned on a side of the bottom portion adjacent to each of the one or more openings.

6. The case of claim 1, wherein the top portion comprises a top handle portion and the bottom portion comprises a bottom handle portion, wherein in the closed configuration, the top handle portion is configured to align with the bottom handle portion to form a handle.

7. The case of claim 1, wherein the top portion comprises one or more accessory docks configured to secure one or more accessories associated with the outdoor power equipment.

8. The case of claim 7, wherein the one or more accessory docks comprise a charger dock configured to secure a battery charger associated with the outdoor power equipment.

9. The case of claim 7, wherein the one or more accessory docks comprise a battery dock configured to secure a battery associated with the outdoor power equipment.

10. The case of claim 1, wherein the top portion comprises a single piece.

11. The case of claim 1, wherein the top portion comprises a plurality of separate pieces, wherein the bottom portion is movably connected to each separate piece of the plurality of separate pieces.

12. The case of claim 1, wherein the bottom portion comprises one or more clips configured to secure the outdoor power equipment in the case.

13. The case of claim 12, wherein the bottom portion further comprises one or more levers, wherein each lever of the one or more levers is coaxial with a clip of the one or more clips, and wherein when depressed by the outdoor power equipment, the one or more levers are configured to apply a torque to the one or more clips to secure the outdoor power equipment in the case.

14. The case of claim 1, wherein at least one of the top portion or the bottom portion comprises one or more openings through which a cord can exit an interior of the case when the outdoor power equipment is in the case.

15. A case for storing outdoor power equipment, comprising:

a top portion; and a bottom portion movably connected to the top portion, wherein the bottom portion has one or more openings to allow one or more wheels of an outdoor power equipment to protrude through the one or more openings;

wherein the top portion and the bottom portion are configured to substantially enclose the outdoor power equipment in a closed configuration, and wherein the top portion comprises a top handle portion and the bottom portion comprises a bottom handle portion, wherein in the closed configuration, the top handle portion is configured to align with the bottom handle portion to form a handle.

16. A case for storing outdoor power equipment, comprising:

a top portion; and a bottom portion movably connected to the top portion, wherein the bottom portion has one or more openings to allow one or more wheels of an outdoor power equipment to protrude through the one or more openings;

wherein:

the top portion and the bottom portion are configured to substantially enclose the outdoor power equipment in a closed configuration, the bottom portion comprises one or more clips configured to secure the outdoor power equipment in the case, and the bottom portion comprises one or more levers, wherein each lever of the one or more levers is coaxial with a clip of the one or more clips, and when depressed by the outdoor power equipment, the one or more levers are configured to apply a torque to the one or more clips to secure the outdoor power equipment in the case.

\* \* \* \* \*